US007231508B2

(12) United States Patent
Master et al.

(10) Patent No.: US 7,231,508 B2
(45) Date of Patent: Jun. 12, 2007

(54) CONFIGURABLE FINITE STATE MACHINE FOR OPERATION OF MICROINSTRUCTION PROVIDING EXECUTION ENABLE CONTROL VALUE

(75) Inventors: Paul L. Master, Sunnyvale, CA (US); W. James Scheuermann, Saratoga, CA (US)

(73) Assignee: Quicksilver Technologies, San Jose, CA (US)

( * ) Notice: Subject to any disclaimer, the term of this patent is extended or adjusted under 35 U.S.C. 154(b) by 327 days.

(21) Appl. No.: 10/022,776

(22) Filed: Dec. 13, 2001

(65) Prior Publication Data

US 2003/0115553 A1 Jun. 19, 2003

(51) Int. Cl.
G06F 9/30 (2006.01)
(52) U.S. Cl. ......................... 712/37; 712/208
(58) Field of Classification Search .................. 712/34, 712/37, 200, 220, 227
See application file for complete search history.

(56) References Cited

U.S. PATENT DOCUMENTS

| 5,301,100 | A | * | 4/1994 | Wagner | ........................ 700/19 |
|---|---|---|---|---|---|
| 5,751,295 | A | * | 5/1998 | Becklund et al. | ........... 345/503 |
| 5,822,308 | A | * | 10/1998 | Weigand et al. | ............ 370/280 |
| 5,822,313 | A | * | 10/1998 | Malek et al. | ................ 370/332 |
| 6,202,130 | B1 | * | 3/2001 | Scales et al. | ................ 711/137 |
| 6,570,877 | B1 | * | 5/2003 | Kloth et al. | ................ 370/392 |
| 6,675,265 | B2 | * | 1/2004 | Barroso et al. | ............. 711/141 |
| 2002/0083305 | A1 | * | 6/2002 | Renard et al. | .............. 712/220 |

* cited by examiner

*Primary Examiner*—Kenneth S. Kim
(74) *Attorney, Agent, or Firm*—Marc S. Kaufman; Nixon Peabody, LLP

(57) ABSTRACT

A microprocessor architecture including a finite state machine in combination with a microcode instruction cache for executing microinstructions. Microinstructions which would normally result in small sequences of high-repetition looped operations are implemented in a finite state machine (FSM). The use of the FSM is more energy-efficient than looping instructions in a cache or register set. In addition, the flexibility of a cache, or other memory oriented approach, in executing microcode instructions is still available. A microinstruction is identified as an FSM operation (as opposed to a cache operation) by an ID tag. Other fields of the microinstruction can be used to identify the type of FSM circuitry to use, direct configuration of a FSM to implement the microinstruction, indicate that certain fields are to be implemented in one or more FSMs and/or in memory-oriented operations such as in a cache or register.

15 Claims, 3 Drawing Sheets

CONFIGURABLE FINITE STATE MACHINE FOR OPERATION OF MICROINSTRUCTION PROVIDING EXECUTION ENABLE CONTROL VALUE

BACKGROUND OF THE INVENTION

This application relates in general to digital processing and more specifically to a digital processor microarchitecture for reducing power consumption in processors.

Reducing power consumption in microprocessor design is becoming more important as increasing numbers of portable digital processing applications, such as cellular telephones, personal digital assistants (PDAs), pocketbook computers, etc., become more popular. Also, as digital processors become faster, and as process technologies allow for increasingly dense designs, the effective capacitance, Ceff, encountered in new processor designs increases. The increased Ceff can require prohibitive amounts of power to achieve desired speeds. Recent projections indicate that traditional processor architectures that include significant random-access memory (RAM) and read-only memory (ROM) in the processor's microstore, cache, buffers, registers and other areas; requires much more power due to fast signal switching requirements encumbered by high Ceff.

Traditionally, the liberal use of memory at the processor level has been desirable. The program store allows the processor to be re-configured with updated instruction set functionality. The design of microprocessor instructions, or the "instruction set," can be changed to a degree without greatly affecting hardware design. The use of a microinstruction cache allows instructions that need to be repeated many times to be more quickly accessed by placing instructions within the loop to be executed in the fast cache. However, the use of large memories and memory caches also require cell arrays, control lines, decode logic, etc., whose operations are highly affected by Ceff. In general, storage accessing has a significant overhead at speeds desired for central processing unit (CPU) instruction execution.

The prior art has tried to minimize the use of memory devices in modern processor architecture designs by making the microinstruction or instruction cache extremely small, and by using large, complex instructions, e.g., very long instruction word (VLIW) or complex instruction set computer (CISC) approaches. These approaches use large instruction words, that can perform one or more functions that would otherwise require multiple, simpler, instructions. At an extreme, a single complex microinstruction might be the entirety of a loop so that frequently-executed loops and functions can be performed by keeping the single microinstruction in a small, single-word cache and executing the same microinstruction many times. However, the mere operation of looping a register, memory or cache, requires high switching speeds of signals in many transistors in the register memory, control memory and associated support circuitry. Such an approach is prohibitive where Ceff is large. The trend of denser numbers of transistors to control more and more circuitry and chip designs is causing a rapid increase in Ceff. Other aspects of microprocessor design can further thwart register and memory oriented approaches.

Thus, it is desirable to provide a system that alleviates one or more shortcomings in the prior art.

SUMMARY OF THE INVENTION

One embodiment of the invention uses a finite state machine in combination with a microcode instruction ("microinstruction") cache. Selected instructions which would normally result in small sequences of high-repetition looped operations are implemented in a finite state machine (FSM). The use of the FSM is more energy-efficient than looping instructions in a cache or register set. In addition, the flexibility of a cache, or other memory oriented approach, in executing microcode instructions is still available.

In a preferred embodiment a microinstruction, or many microinstructions, are identified as an FSM operation (as opposed to a cache operation) by an ID tag. Other fields of the microinstruction can be used to identify the type of FSM circuitry to use, direct configuration of a FSM to implement the microinstruction, indicate that certain fields are to be implemented in one or more FSMs and/or in memory-oriented operations such as in a cache or register.

In one embodiment, the invention provides a digital processor responsive to a microinstruction to perform an operation, the digital processor comprising, a memory for storing data associated with the operation to be performed; a finite state machine (FSM) for performing a function in association with the operation; and control circuitry for providing data to the register and for starting execution of the FSM in response to the microinstruction.

DESCRIPTION OF A PREFERRED EMBODIMENT

Figure 1:
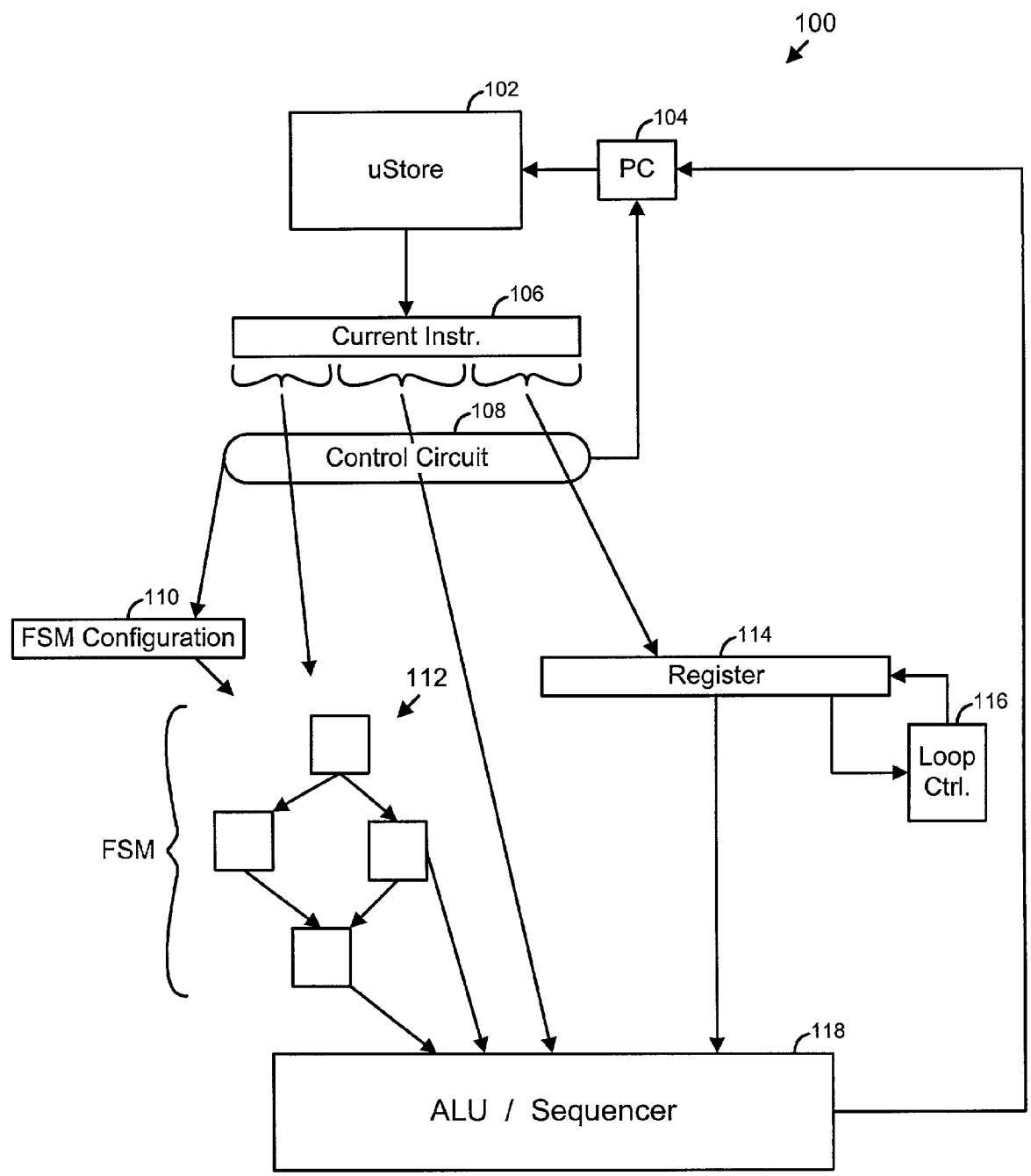
FIG. 1 shows basic components of the present invention.

FIG. 1 illustrates a preferred embodiment of the invention.

In FIG. 1, microprocessor architecture 100 includes microstore 102 for storing microinstructions for execution by the components of the microprocessor architecture. As is known in the art, such instructions direct memory and register accessing, logical and arithmetic data operations, sequencing operations, and other operations to direct hardware in a digital processing system to perform functionality according to instructions stored in system memory (not shown).

Microstore 102 is indexed by program counter 104 to access a location of a current microinstruction whose data is output as current instruction 106. Note that a separate register or latch can be used to hold the current microinstruction, or the data can simply be output directly from the microstore. Many approaches to accessing and manipulating microinstructions are possible and are within the scope of the present invention.

The current microinstruction is used by control circuitry 108 to direct finite state machine (FSM) 112, FSM configuration 110 and memory oriented circuitry such as register 114 and loop control 116 to perform functions in accordance with the current microinstruction. Control circuitry 108 can also be used to direct, or control, other components in the system such as program counter 104, arithmetic/logic hardware and sequencing hardware 118, system memory accesses, etc.

Register 114 and loop control 116 can be microinstruction looping components as are known in the art. Other standard architecture components can be used. In a preferred embodiment, control circuitry 108 determines whether the current instruction, or a portion of the current instruction, is suitable, or has been designated, for using FSM processing. If so, control circuitry 108 directs the use of FSM 112 to execute according to data in the current instruction. In applications where the FSM is configurable, FSM configuration circuit 110 is used to pre-configure FSM 112, as desired. Note that any number of configurable, or fixed, FSMs can be used. For ease of illustration, only one is shown in FIG. 1.

Control circuitry 108 can be implemented in various ways, as desired. For example, in a simple implementation the control circuitry need be no more than hardwired routing of control signals and data in the current instruction, or from the microstore, to the appropriate components (such as FSM 112 or register 114). Other implementations can use multiplexers, gates or other devices to more flexibly control, generate, process, monitor, etc., the information from a microinstruction and use the information to control components.

Note that memory oriented circuitry can be other than a simple register and loop control. For example, multiple registers can be used. A memory bank can be employed, fast memory can be used as a cache, etc. In general, an FSM can be used in combination with any type of computer architecture, including additional FSMs.

FSM configuration circuitry 110 can be invoked by earlier instructions to prepare an FSM for later use by a different microinstruction. Alternatively, portions of an instruction can be used to direct configuration of the FSM via the configuration circuitry, while other parts of the same instruction serve to control FSM execution. In some applications, control of an FSM need not be more involved than merely invoking the FSM to begin execution.

Figure 2A:
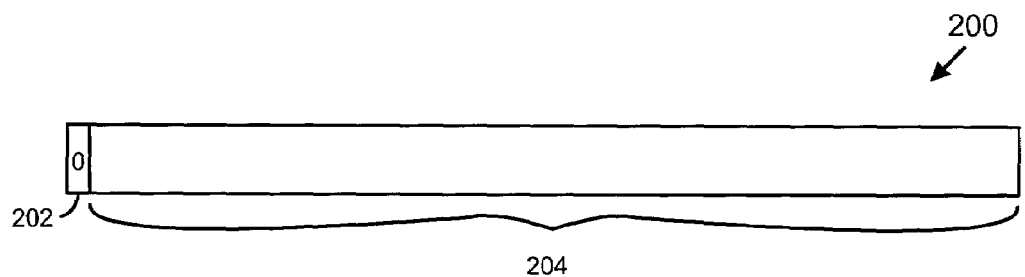
FIG. 2A is a first diagram of an FSM control designation in a microinstruction.
Figure 2B:
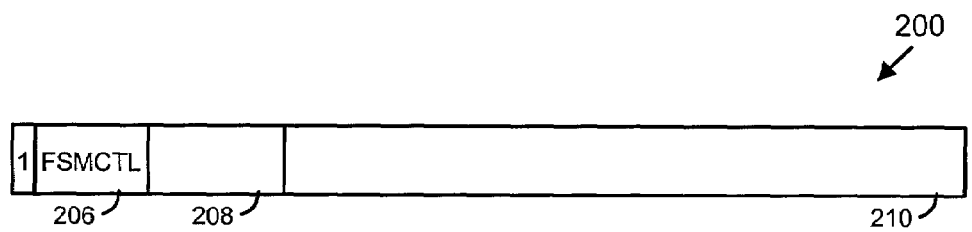
FIG. 2B is a second diagram of an FSM control designation in a microinstruction.
Figure 2C:
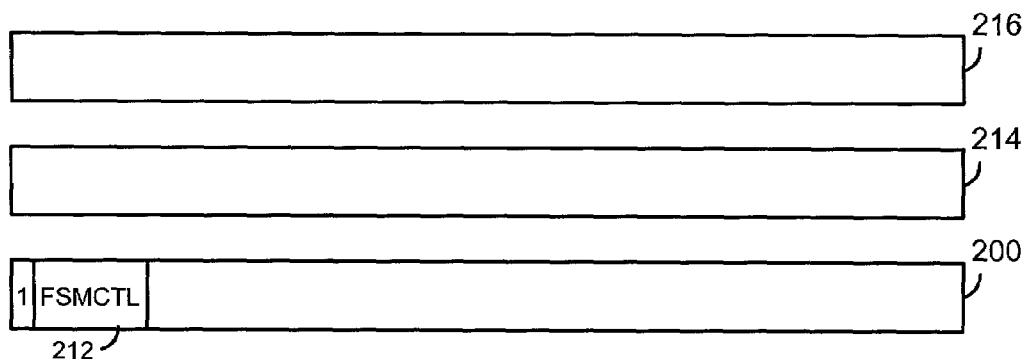
FIG. 2C is a third diagram of an FSM control designation in a microinstruction.

FIGS. 2A-C illustrate different types of FSM control microinstructions.

In FIG. 2A, microinstruction 200 includes typical fields 204 for directing the operation of CPU circuitry. Typical fields can be, e.g., a next address field, arighmetic logic unit (ALU) control field, register access field, memory access, access mode, etc. Additionally, an FSM control bit FSMCTL at 202 is reserved. FSMCTL is set to 0 the FSM feature of the present invention is not invoked. In this case, the CPU can behave as a traditional processor. However, when FSMCTL is set to 1 then fields 204, and subsequent fields in subsequent instructions, can invoke FSM processing.

FIG. 2B illustrates the microinstruction format where FSM control is enabled.

In FIG. 2B, microinstruction 200 now has FSM control bit 202 set to 1. This enables FSMCTL control field 206 which would otherwise be used for other purposes. Depending on the microinstruction set design, additional fields such as 208, etc., can be used for FSM control. In different embodiments, many different arrangements for determining when, and how, a microinstruction (or instructions) will be interpreted to control an FSM. For example, other approaches can use fixed, predetermined fields for FSM control so that an FSM control bit is not needed. The configuration information for the FSM can be stored in these fields.

FIG. 2C illustrates an FSM control mode where multiple instructions are used.

In FIG. 2C, the FSM control bit is set to 1. FSMCTL field 212 then indicates how many microinstruction words following word 200 are to be used for FSM control. In this example, the remaining fields of microinstruction 200 along with the next two microinstructions, 214 and 216, can be used in their entirety for FSM-related purposes.

In other embodiments, the FSM control bit can be derived from a signal generated by hardware within the digital processing system, or obtained or derived from an external source. One refinement is to provide control circuit 108 of FIG. 1 with a "power saving mode" signal. When on, control circuit 108 will attempt to utilize FSM execution unit hardware as much as possible. When off, the emphasis will be on speed of execution which. One approach is to provide parallel instructions for different functions to be executed. One set of microinstructions is FSM oriented while the other is non-FSM. The control circuitry can selectively retrieve the desired (FSM, or non-FSM) instructions from a microstore as dictated by the power saving mode. Both the FSM and normal microstore operations could be executing in parallel.

Figure 3:
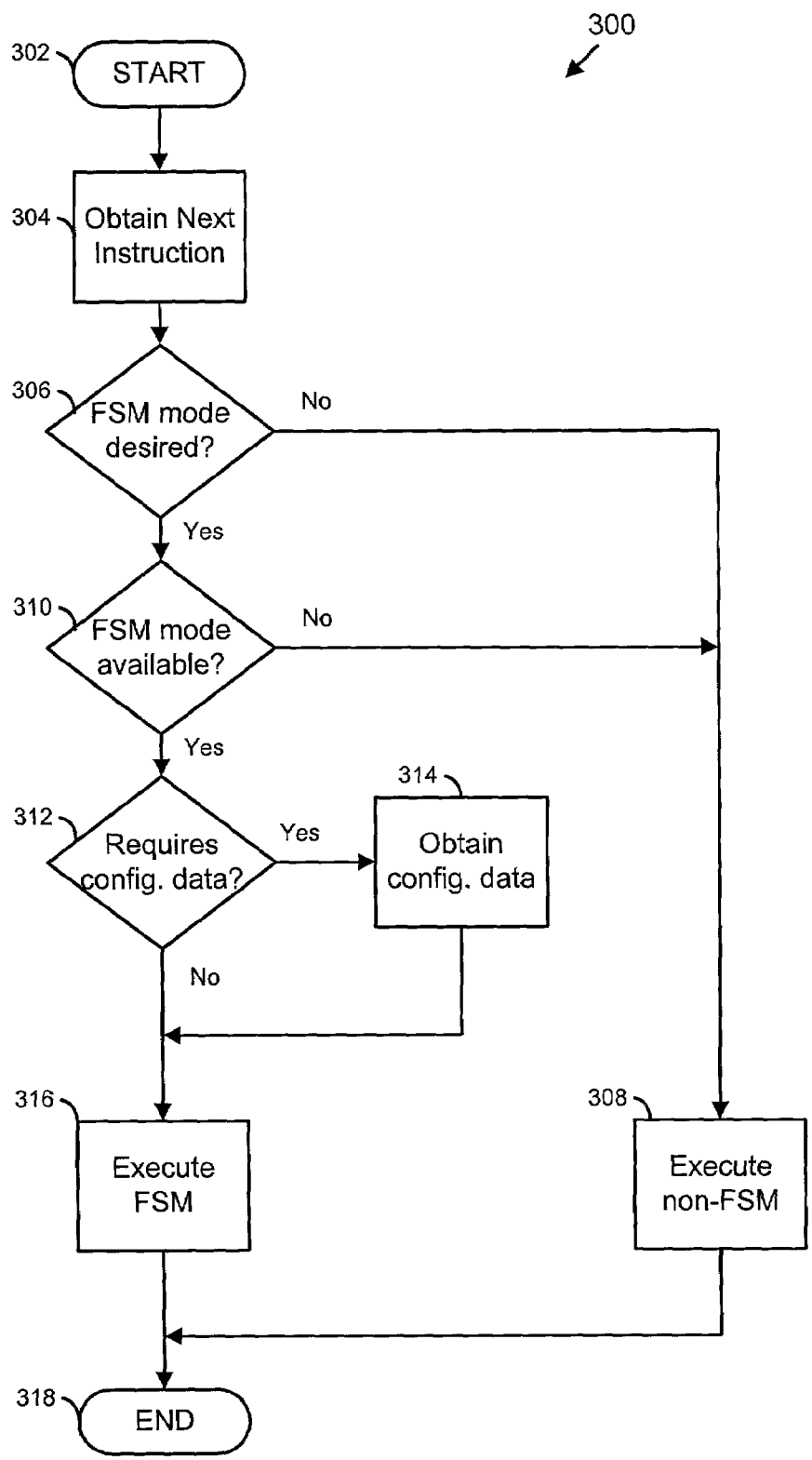
FIG. 3 is a flowchart of basic steps in a routine to determine whether FSM circuitry is invoked.

FIG. 3 illustrates a flowchart showing basic steps in a routine to determine whether FSM circuitry, such as FSM 110 of FIG. 1, is invoked.

In FIG. 3, the routine of flowchart 300 is entered at step 302. At step 304, a next microinstruction to be executed is obtained. At step 306, a determination is made as to whether FSM mode execution is desired, or directed. As discussed above, this determination can be made from information in the obtained microinstruction, itself, or from a different microinstruction or from a control signal. If not desired, then step 308 is performed to execute the microinstruction's functions or operations in a non-FSM manner.

If, however, it is desired at step 306 to use FSM mode execution then step 310 is next executed to check whether FSM mode is available. Even though desired, FSM mode may not be available for a variety of reasons including lack of availability of the FSM execution unit (112 of FIG. 1), or lack of other resources. In an embodiment where dual sets of microinstructions are used to allow FSM or non-FSM modes for same operations, not all operations may be provided with dual FSM microinstructions so that FSM mode execution will not be possible. If FSM mode is not possible then step 308 is executed to execute the microinstruction's operations in a non-FSM mode.

If FSM mode is possible then step 312 is performed to check whether configuration data is needed. If so, step 314 obtains the configuration data. Configuration data can be provided by microinstructions, data elsewhere in the system, or hardwired circuitry for frequently used tasks. After configuration, or if it determined that configuration is not necessary, execution proceeds to step 316 where microinstruction operations are executed in an FSM mode and the routine exits at step 318.

Note that the functionality described by the steps of FIG. 3 may be achieved in many different ways. Steps can be added to or removed from those shown in FIG. 3. The steps can be modified and the sequencing can vary without departing from the scope of the invention. The functionality can be achieved by hardware, software or a combination of both.

Although the invention has been described with respect to specific embodiments above, the embodiments are merely illustrative, and not restrictive, of the invention. For example, even though aspects of the invention have been described advantageously reducing power consumption, the invention can be applied to designs where use of an FSM along with other execution units is desirable for other reasons. In some applications, power consumption may actually increase. For example, reducing the area of a design can be achieved, faster implementation of certain microinstructions can be realized (resulting in faster performance), advantages in microinstruction length, complexity, organization, execution, etc., can be obtained.

Although a distinction has been made between FSM and non-FSM execution, these terms are intended to mean either use of specialized FSM execution unit circuitry or non-use of such circuitry for a specific instruction, set of instructions, or portion of instruction. The term "non-FSM" or similar does not mean that no FSM is used. Nor does "FSM" mean that only FSM circuitry is used. For example, a non-FSM execution may still use FSM circuitry, but not the specialized FSM circuitry that is illustrated as FSM 112 of FIG. 1. In the art, FSM is a design approach that can be used to implement many different functions. For example, it is popular to use an FSM to generate control signals so that an FSM may be used in control circuitry 108 and ALU hardware/sequencer 118. The discussion herein, relating to use or non-use of FSM execution hardware includes specialized FSM circuitry that is selectable according to a microinstruction's fields, a control signal, or other component or approach discussed or implied herein. The type of specialized circuitry can vary widely. The same specialized circuitry need not be used for different instructions, or even for a same instruction executed at a later time.

Thus, the scope of the invention is to be determined solely by the appended claims.

What is claimed is:

1. A digital processor responsive to a microinstruction to perform an operation, the digital processor comprising:
    a memory for storing data associated with the operation to be performed;
    a finite state machine configuration circuit;
    a configurable finite state machine (FSM) coupled to the finite state machine configuration circuit, the configurable finite state machine configurable to perform a function in association with the operation; and
    control circuitry for providing data to the memory and for enabling execution of the FSM in response to detecting a predefined value in a field in the microinstruction.

2. The digital processor of claim 1, further comprising loop control circuitry for repetitively accessing the data stored in the memory.

3. The digital processor of claim 1, wherein the control circuitry further comprises detection circuitry for determining that at least a portion of a microinstruction is to be implemented by the configurable finite state machine.

4. The digital processor of claim 1, further comprising a plurality of finite state machines, and
    wherein the control circuitry further comprises:
        finite state machine execution circuitry to selectively invoke operation of one or more of the plurality of finite state machines.

5. The digital processor of claim 1, wherein the finite state machine configuration circuit further comprises circuitry to direct the configurable finite state machine to be configured in advance for a predetermined function associated with the microinstruction.

6. The digital processor of claim 1, wherein the memory further comprises a register.

7. The digital processor of claim 1, wherein the memory further comprises a microstore.

8. The digital processor of claim 1, wherein the memory further comprises a cache.

9. The digital processor of claim 1, wherein multiple instructions are used for configurable finite state machine control.

10. The digital processor of claim 9, wherein a predetermined field is used to indicate how many microinstructions are to be used for configurable finite state machine control.

11. A method for executing a microinstruction, the method comprising:
    configuring a configurable finite state machine to implement a first function indicated by the microinstruction;
    using both the finite state machine and an iterative register to perform at least a portion of the first function indicated by the microinstruction;
    allowing execution of the finite state machine if a predefined value in a field in the microinstruction is detected; and
    concurrently using processing circuitry to perform a second function indicated by the microinstruction.

12. The digital processor of claim 1, wherein the predefined value is represented by a single bit.

13. The digital processor of claim 12, wherein a bit value of 0 prevents configurable finite state machine execution, wherein a bit value of 1 enables configurable finite state machine execution.

14. The digital processor of claim 1, wherein when configurable finite state machine execution is enabled a predetermined field in the microinstruction is used to invoke configurable finite state machine processing.

15. The digital processor of claim 14, wherein when configurable finite state machine execution is prevented the predetermined field in the microinstruction is used for a purpose other than to invoke FSM processing.

* * * * *